United States Patent [19]

Tsukada et al.

[11] Patent Number: 4,930,811

[45] Date of Patent: Jun. 5, 1990

[54] PROTECTING DEVICE FOR A PLASTIC FUEL TANK OF A MOTOR VEHICLE

[75] Inventors: Teruhisa Tsukada; Masao Saito; Masao Fuse; Nobuharu Sakon, all of Ohta, Japan

[73] Assignee: Fuji Jukogyo Kabushiki Kaisha, Tokyo, Japan

[21] Appl. No.: 216,901

[22] Filed: Jul. 8, 1988

[30] Foreign Application Priority Data

Jul. 28, 1987 [JP] Japan .............................. 62-115589
Jul. 28, 1987 [JP] Japan .............................. 62-115591

[51] Int. Cl.⁵ .............................................. B60K 15/02
[52] U.S. Cl. ................................. 280/834; 180/69.4; 180/89.2
[58] Field of Search .............. 280/5 A, 5 R, 832, 834; 180/69.4, 296, 309, 89.2

[56] References Cited

U.S. PATENT DOCUMENTS 4,369,981  1/1983  Chiba et al. ...................... 280/834
4,553,681 11/1985  Heaume .............................. 280/5 A

FOREIGN PATENT DOCUMENTS 2340257  2/1975  Fed. Rep. of Germany ..... 280/5 A
3445427  7/1985  Fed. Rep. of Germany ..... 280/5 A
0190023 10/1984  Japan .................................. 280/5 A
0028530  7/1986  Japan .................................. 280/5 A Primary Examiner—David M. Mitchell
Attorney, Agent, or Firm—Martin A. Farber

[57] ABSTRACT

A flame cutoff plate is disposed between an exhaust pipe of an engine and a side wall of the fuel tank to cover a pinch-off portion of the fuel tank without contacting the wall of the fuel tank.

4 Claims, 2 Drawing Sheets

PROTECTING DEVICE FOR A PLASTIC FUEL TANK OF A MOTOR VEHICLE

BACKGROUND OF THE INVENTION

The present invention relates to a device for protecting a fuel tank made of synthetic resin from heat of a muffler and an exhaust pipe in an exhaust system of an automotive engine and from fire on roads.

Plastic fuel tanks are generally manufactured by blow molding. Therefore, as shown in FIG. 4, a fuel tank 1 has a pinch-off portion 3 on a side wall 2 of the fuel tank 1 at a juncture thereof.

Such a plastic fuel tank is easily deformed by fire and heat. Japanese Patent Laid Open 57-140226 discloses a fuel tank, a body of which is covered with heatproof material to improve its heatproof and fireproof characteristics. In accordance with another means for protecting the tank from heat, a part of the exhaust system such as a muffler is covered with a plate for intercepting the heat.

For example, in a device shown in FIG. 5, a muffler 4 is disposed under a car body adjacent a fuel tank 1. A heat cutoff plate 5 encloses a main part of the muffler 4 to prevent the heat of the muffler from affecting the tank 1.

However, the heat cutoff plate acts to intercept only the heat of the exhaust system. Accordingly, when a fire breaks out in the exhaust system as a result of overheating, or breaks out on the road, the cutoff plate can not prevent the tank from the flames, so that the flames touch the side walls of the tank 1 as shown by arrows in FIG. 5. The flames heat the walls of the tank, thereby breaking a part of the walls, especially the pinch-off portion. Further, the side walls above the level of the fuel in the tank such as gasoline is heated earlier than the lower portions of the side walls, because the inside of the upper side walls which is above the level of the fuel does not contact the fuel. Accordingly, a part of the side walls of the lower portion adjacent the pinch-off is stretched by the weight of the fuel and the tank. Thus, this part gradually thins out, resulting in breaking of the part.

In order to prevent such trouble, a fuel tank having a thick wall is used or a heat cutoff plate is provided to completely cover the underside of the tank. However, such measures increase the manufacturing costs. Moreover, water enters into the space between the heat cutoff plate and the fuel tank, which will cause corrosion of the heat cutoff plate.

SUMMARY OF THE INVENTION

The object of the present invention is to provide a device for covering a pinch-off portion of a synthetic resin tank so as to prevent the tank from deformation and injury caused by heat and flame.

According to the present invention, there is provided a device for protecting a plastic fuel tank for an engine of a motor vehicle from flame comprising a flame cutoff plate disposed between an exhaust gas passage member of the engine and a wall of the fuel tank to cover a pinch-off portion of the fuel tank without contacting the wall of the fuel tank.

In an aspect of the present invention, the exhaust gas passage member is a muffler, and the flame cutoff plate is disposed above the muffler and between a side wall of the fuel tank and muffler.

The other objects and features of this invention will become understood from the following description with reference to the accompanying drawings.

DETAILED DESCRIPTION OF THE PREFERRED EMBODIMENTS

Figure 1:
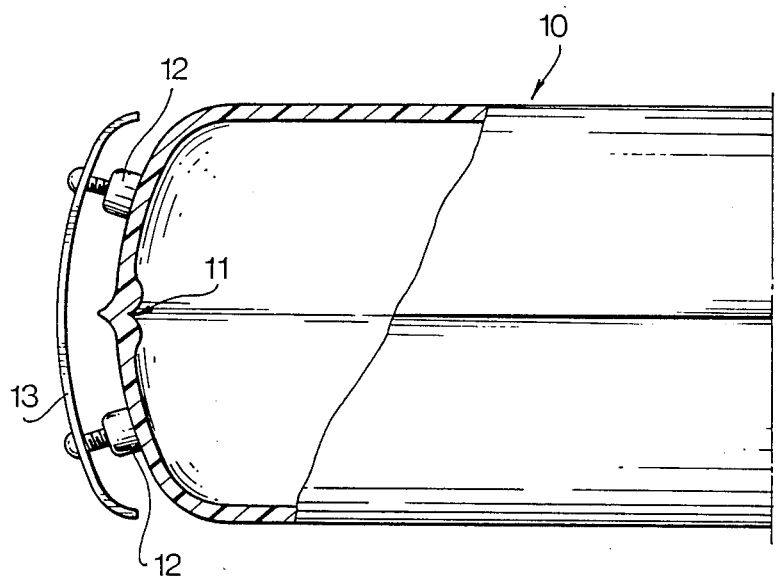
FIG. 1 is a fragmentary sectional view of an arrangement of a fuel tank and a flame cutoff plate according to the present invention.
Figure 4:
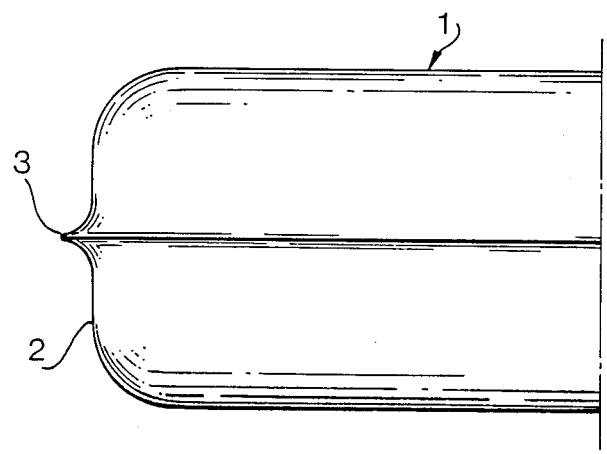
FIG. 4 is a schematic view of a conventional fuel tank formed by blow molding.

Referring to FIG. 1 showing a first embodiment of the present invention, a blow-molded plastic fuel tank 10 has a circumferential pinch-off portion 11 at a juncture of the tank 10. A plurality of bosses 12 are fixed to a side wall of the tank 10 by hot welding. A flame cutoff plate 13 is fixed on the bosses 12 by screws so as to cover the side wall including the pinch-off portion 11. Thus, the pinch-off 11 is prevented from deforming.

Figure 2:
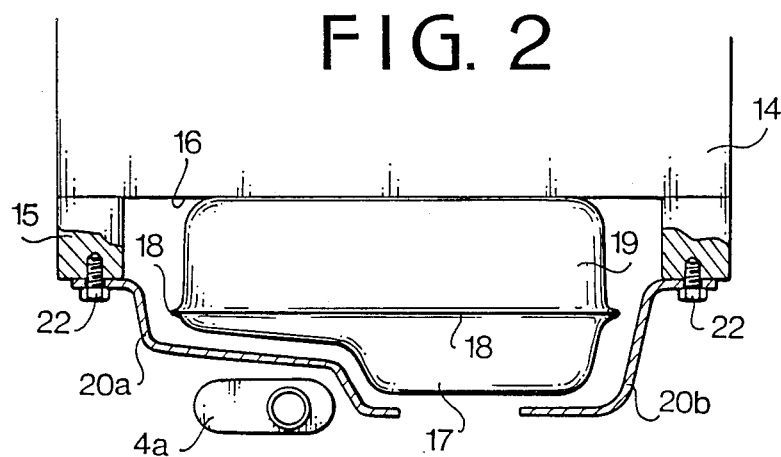
FIGS. 2 and 3 are schematic views showing examples of arrangements of fuel tanks and flame cutoff plates of a second embodiment.

Referring to FIG. 2 showing a second embodiment, a plurality of projections 15 projects from a car body 14 so as to define a recess 16. A plastic fuel tank 17 having a pinch-off portion 18 on a side periphery 19 thereof is disposed in the recess 16 on the underside of the car body 14. A flame cutoff plate 20a is disposed between one of side walls of the tank 17 and a muffler 4a and another flame cutoff plate 20b is disposed adjacent a side wall opposite the flame cutoff plate 20a. An upper end of each plate is secured to respective projection 15 by screws 22 and the lower end extends horizontally underneath the fuel tank 17, so that the plate 20a, 20b cover the side periphery 19 of the fuel tank including the pinch-off portion 18. Thus, the space surrounding the fuel tank 17 is enclosed by the plates 20a and 20b. Accordingly, even if a fire breaks out from under the fuel tank 17, the flame is guided toward the sides of the tank without entering the space surrounding the tank, so that the heat is not trapped therein.

Figure 3:
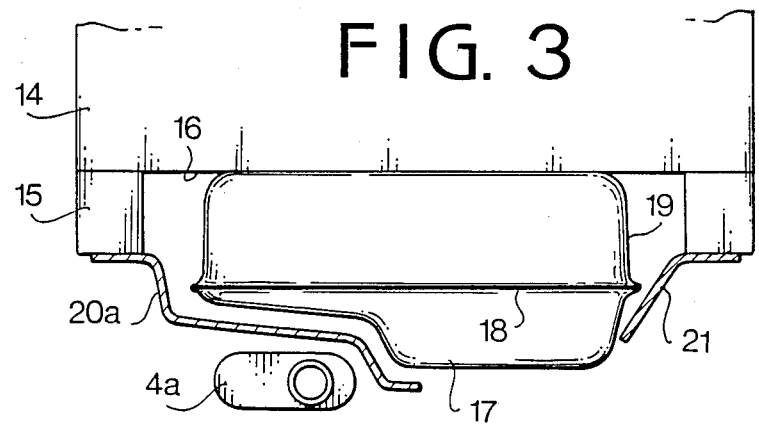
Figure 5:
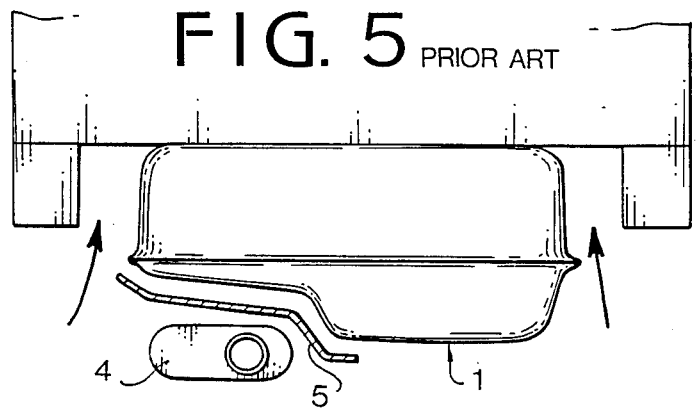
FIG. 5 is a schematic view showing an arrangement of fuel tank and heat cutoff plate in prior art.

Referring to FIG. 3 showing another example of the second embodiment, a lower end of a flame cutoff plate 21 is provided adjacent to the periphery 19 of one side of the tank 17 so as to cover at least the pinch-off portion 18 on the periphery 19. Therefore, the upper portion of the side walls of the tank 17 above the pinch-off portion 18, the inner side of which upper portion does not make contact with the fuel, and the pinch-off portion 18 are prevented from deformation by heat.

In accordance with the present invention, the pinch-off portion of the fuel tank is protected by the flame cutoff plates provided between the tank and a member or an exhaust pipe of an exhaust system. Therefore, a side wall of the fuel tank is prevented from thinning out and hence the fuel tank is prevented from splitting. Additionally, a portion of the tank above the pinch-off portion where the fuel is most prone to run out is protected so that the portion, which tends to be deteriorated by the heat, is prevented from deformation and damage.

While the presently preferred embodiments of the present invention have been shown and described, it is to be understood that this disclosure is for the purpose

What is claimed is:

1. A device for protecting a plastic fuel tank for an engine of a motor vehicle from flame, the fuel tank having a pinch-off portion, the device comprising;
    a flame cutoff plate disposed between an exhaust gas passage member of the engine and a wall of the fuel tank spaced from said wall so as to cover said pinch-off portion of the fuel tank without contacting the wall of the fuel tank;
    the flame cutoff plate is secured to the fuel tank;
    a plurality of bosses fixed to a side wall of the tank by hot welding; and
    said flame cutoff plate is fixed on the bosses by screws so as to cover the side wall including the pinch-off portion.

2. A device for protecting a plastic fuel tank for an engine of a motor vehicle from flame, the fuel tank having side walls including a pinch-off portion, the device comprising:
    a flame cutoff plate disposed between an exhaust gas passage member of the engine and a wall of the fuel tank spaced from said wall so as to cover said pinch-off portion of the fuel tank without contacting the wall of the fuel tank;
    the flame cutoff plate is secured to a body of the motor vehicle;
    a plurality of projections projects from the body of the vehicle so as to define a recess in which said fuel tank is located on an underside of the body;
    said flame cutoff plate is disposed between the tank and said exhaust gas passage member and extends adjacent one side wall of the tank, and another flame cutoff plate is disposed adjacent another side wall of the tank opposite the first-mentioned flame cutoff plate, so that said plates cover the side periphery of the fuel tank including the pinch-off portion, upper ends of said plates being secured to said projections, respectively;
    a lower end of each of said flame cutoff plates is free; and
    at least one of said lower ends extends horizontally under said fuel tank spaced therefrom; and
    another of said lower ends is positioned above a bottom of said fuel tank and lower than said pinch-off portion, the corresponding said flame cutoff plate extending linearly inclined from a bent off portion thereof secured to a corresponding of said projections.

3. A device for protecting a plastic fuel tank for an engine of a motor vehicle from flame, the fuel tank having a side wall with a pinch-off portion, the vehicle having an exhaust gas passage member, the device comprising
    a flame cutoff plate disposed between the exhaust gas passage member and a wall of the fuel tank spaced from the wall and extending to cover the side wall including the pinch-off portion of the fuel tank without contacting the fuel tank,
    a plurality of bosses fixed to the side wall by hot welding, and
    the flame cutoff plate fixed on the bosses by screws, so as to secure the flame cutoff plate to the fuel tank and to prevent the tank from deformation by heat.

4. A device for protecting a plastic fuel tank for an engine of a motor vehicle from flame, the fuel tank having side walls with a pinch-off portion, the vehicle having an exhaust gas passage member and a plurality of projections projecting from a body of the vehicle to define a recess in which the fuel tank is located on an underside of the body, the device comprising
    a flame cutoff plate disposed adjacent one of the side walls and between the exhaust gas passage member and a bottom wall of the fuel tank and spaced from the side and bottom walls to cover the pinch-off portion of the fuel tank without contacting the side and bottom walls of the fuel tank,
    another flame cutoff plate disposed adjacent another of the side walls opposite to the first flame cutoff plate,
    upper ends of the flame cutoff plates are secured to the projections, respectively,
    a lower end of each of the flame cutoff plates is free,
    at least one of the lower ends extends horizontally under the fuel tank spaced therefrom, and
    another of the lower ends is positioned above a bottom of the fuel tank and lower than the pinch-off portion, the corresponding said flame cutoff plate extending linearly inclined from a bent off portion thereof secured to a corresponding of the projections, so that the plates cover the side periphery of the fuel tank in conjunction with the projections to prevent the tank from deformation by heat.

* * * * *